United States Patent
Kojima et al.

(10) Patent No.: US 11,261,314 B2
(45) Date of Patent: Mar. 1, 2022

(54) PNEUMATIC TIRE

(71) Applicant: SUMITOMO RUBBER INDUSTRIES, LTD., Hyogo (JP)

(72) Inventors: Ryoji Kojima, Hyogo (JP); Tsuyoshi Tsuchida, Hyogo (JP); Yukari Tomisaki, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 18 days.

(21) Appl. No.: 16/767,818

(22) PCT Filed: Nov. 21, 2018

(86) PCT No.: PCT/JP2018/043057
§ 371 (c)(1),
(2) Date: May 28, 2020

(87) PCT Pub. No.: WO2019/111717
PCT Pub. Date: Jun. 13, 2019

(65) Prior Publication Data
US 2021/0002460 A1   Jan. 7, 2021

(30) Foreign Application Priority Data
Dec. 6, 2017 (JP) .............................. JP2017-234634

(51) Int. Cl.
*C08L 9/06* (2006.01)
(52) U.S. Cl.
CPC ...................... *C08L 9/06* (2013.01)
(58) Field of Classification Search
CPC .. B60C 11/00; B60C 1/00; C08K 3/36; C08K 5/54; C08K 3/04; C08L 9/06; C08L 21/00; Y02T 10/86
(Continued)

(56) References Cited

U.S. PATENT DOCUMENTS

2007/0137748 A1   6/2007   Itai
2008/0047643 A1   2/2008   Takahashi
(Continued)

FOREIGN PATENT DOCUMENTS

CN   101117406   2/2008
CN   101665063   3/2010
(Continued)

OTHER PUBLICATIONS

ISR issued in WIPO Patent Application No. PCT/JP2018/043057, Feb. 19, 2019, English translation.
(Continued)

*Primary Examiner* — Hui H Chin
(74) *Attorney, Agent, or Firm* — Greenblum & Bernstein, P.L.C.

(57) ABSTRACT

A pneumatic tire comprising a tread composed of a rubber composition containing 30 to 120 parts by mass of silica having a BET specific surface area of 180 to 280 $m^2/g$ based on 100 parts by mass of a rubber component, wherein, under a normal state with no load where the pneumatic tire is mounted with a normal rim and filled with a normal internal pressure, a grounding surface shape in which a normal load is applied and the tread is pressed against a plane surface satisfies the following equation (1): $0.95 \leq SL0/SL80 \leq 1.6$ (wherein, SL0 is a ground contact length in a circumferential direction of the tire on a tire equator, and SL80 is a ground contact length in a circumferential direction of the tire on a position away from the tire equator by a distance in a tire axial direction of 80% of a tread grounding half width.)

7 Claims, 1 Drawing Sheet

(58) Field of Classification Search
USPC .......................................................... 524/322
See application file for complete search history.

(56) References Cited

U.S. PATENT DOCUMENTS

| | | | |
|---|---|---|---|
| 2008/0223494 A1 | 9/2008 | Amino et al. | |
| 2010/0051153 A1 | 3/2010 | Kojima et al. | |
| 2010/0224301 A1 | 9/2010 | Sakamoto et al. | |
| 2011/0230593 A1* | 9/2011 | Kondo | C08L 7/00 |
| | | | 523/156 |
| 2012/0305159 A1 | 12/2012 | Sakamoto et al. | |
| 2014/0230984 A1 | 8/2014 | Miyazaki | |
| 2015/0174965 A1 | 6/2015 | Tanaka et al. | |
| 2018/0273724 A1 | 9/2018 | Miyazaki | |

FOREIGN PATENT DOCUMENTS

| | | |
|---|---|---|
| CN | 102947379 | 2/2013 |
| CN | 103072432 | 5/2013 |
| CN | 103958171 | 7/2014 |
| CN | 104723796 | 6/2015 |
| EP | 2719723 A1 | 4/2014 |
| EP | 3222440 A1 | 9/2017 |
| JP | 2001-138716 A | 5/2001 |
| JP | 2006-076395 A | 3/2006 |
| JP | 2007-168578 A | 7/2007 |
| JP | 2008-049967 A | 3/2008 |
| JP | 2008-303328 A | 12/2008 |
| JP | 2008291066 | 12/2008 |
| JP | 2009-078790 A | 4/2009 |
| JP | 2010-076744 A | 4/2010 |
| JP | 2013-091444 A | 5/2013 |
| JP | 2015-196759 A | 11/2015 |
| JP | 2016-124438 A | 7/2016 |
| JP | 2017-075227 A | 4/2017 |
| JP | 2017-088898 A | 5/2017 |
| WO | 2015/147274 | 4/2017 |

OTHER PUBLICATIONS

IPRP issued in WIPO Patent Application No. PCT/JP2018/043057, Jun. 9, 2020, English translation.

EESR issued in EP Patent Application No. 18885419.4, Dec. 21, 2020.

Office Action issued in Chinese Patent Application No. 201880072694.6, dated Aug. 30, 2021, English translation.

* cited by examiner

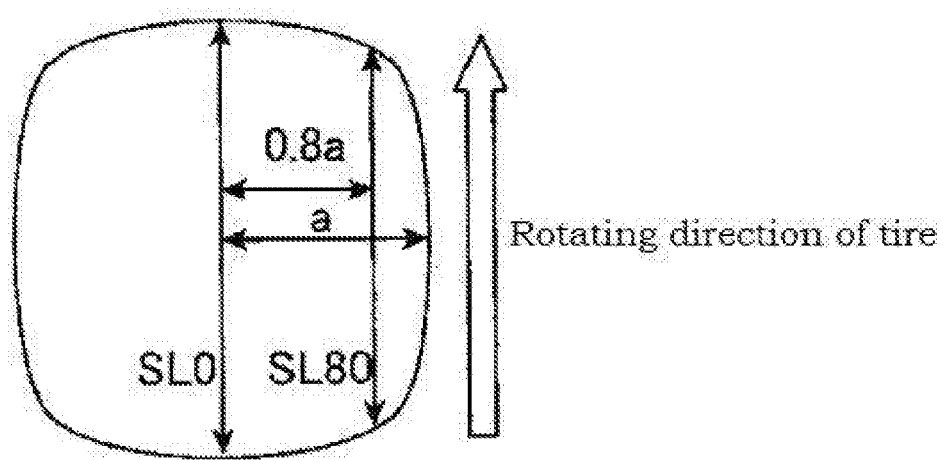

PNEUMATIC TIRE

TECHNICAL FIELD

The present invention relates to a pneumatic tire comprising a tread composed of a rubber composition containing a rubber component and a predetermined amount of a fine particle silica.

BACKGROUND ART

In recent years, as market demands have increased, it has been required for a longer service life of and a higher durability of a tire and for improvement in abrasion resistance of a tread rubber.

On the other hand, at the same time, it has also been required for reduction in rolling resistance of a tire due to demand for a low fuel consumption, and silica is generally used as a reinforcing filler for a high-performance tire for a passenger car.

Further, Patent Document 1 discloses that a high-performance studless tire can be provided which has both a good braking force and steering stability on ice and snow by using a rubber composition containing 0.5 to 5.0 parts by mass of a fatty acid and/or a derivative thereof for a tread and forming the tread into a specific grounding surface shape.

PRIOR ART DOCUMENT

Patent Document

Patent Document 1: JP 2010-76744 A

SUMMARY OF THE INVENTION

Problem to be Solved by the Invention

As such, in order to improve abrasion resistance, there may be a method for improving toughness of a rubber by increasing a specific surface area of a reinforcing filler and increasing a bonding site with a polymer. However, it is still insufficient.

Further, in Patent Document 1, abrasion resistance is not particularly improved, and thus there is still room for improvement.

Therefore, an object of the present invention is to provide a pneumatic tire with improved abrasion resistance of a tread.

Means to Solve the Problem

In consideration of the above problem, the present inventors have found out that abrasion resistance can be further improved by specifying a grounding surface shape within a predetermined range for the purpose of controlling input to a rubber during rolling of a tire and, at the same time, by increasing a specific surface area of a reinforcing filler (particularly, silica) and completed the present invention.

That is, the present disclosure relates to:

[1] a pneumatic tire comprising a tread composed of a rubber composition, the rubber composition containing 30 to 120 parts by mass, preferably 40 to 100 parts by mass, more preferably 50 to 90 parts by mass of silica having a BET specific surface area of 180 to 280 m²/g, preferably 190 to 260 m²/g, more preferably 200 to 250 m², even more preferably 235 to 250 m²/g based on 100 parts by mass of a rubber component, wherein, under a normal state with no load where the pneumatic tire is mounted with a normal rim and filled with a normal internal pressure, a grounding surface shape in which a normal load is applied and the tread is pressed against a plane surface satisfies the following equation (1):

$0.95 \leq SL0/SL80 \leq 1.6$ (preferably $1.00 \leq SL0/SL80 \leq 1.55$, more preferably $1.05 \leq SL0/SL80 \leq 1.50$, even more preferably $1.05 \leq SL0/SL80 \leq 1.45$)(1)

(wherein, SL0 is a ground contact length in a circumferential direction of the tire on a tire equator, and SL80 is a ground contact length in a circumferential direction of the tire on a position away from the tire equator by a distance in a tire axial direction of 80% of a tread grounding half width.);

[2] The pneumatic tire according to [1], wherein the rubber composition further contains carbon black;

[3] The pneumatic tire according to [1] or [2], wherein the rubber composition further contains a silane coupling agent; and

[4] The pneumatic tire according to any of [1] to [3], wherein the tread has a JIS A hardness of 55 to 80, preferably 56 to 80, more preferably 56 to 77, even more preferably 60 to 75, particularly preferably 65 to 70.

Effects of the Invention

According to the present invention, a pneumatic tire with improved abrasion resistance can be provided by comprising a tread composed of a rubber composition containing 30 to 120 parts by mass of silica having a BET specific surface area of 180 to 280 m²/g based on 100 parts by mass of a rubber component and by having a grounding surface shape index in which a predetermined grounding surface shape satisfies the above equation (1).

BRIEF DESCRIPTION OF THE DRAWINGS

FIG. 1 is a schematic view showing a grounding surface shape in which a tread is pressed against a plane surface.

EMBODIMENT FOR CARRYING OUT THE INVENTION

The pneumatic tire of the present invention comprises a tread composed of a rubber composition containing 30 to 120 parts by mass of silica having a BET specific surface area of 180 to 280 m²/g based on 100 parts by mass of a rubber component, wherein under a normal state with no load where the pneumatic tire is mounted with a normal rim and filled with a normal internal pressure, a grounding surface shape in which a normal load is applied and the tread is pressed against a plane surface satisfies the above equation (1).

The pneumatic tire of the present invention uses a predetermined amount of particulate silica having a predetermined specific surface area in a rubber composition for a tread, and further has a grounding surface in a predetermined shape, whereby it can maximize abrasion resistance of the particulate silica having a predetermined specific surface area since the pneumatic tire can control a mechanical input which the rubber on the tire surface receives under optimal state.

(Rubber Component)

A diene-based rubber is preferably used as a rubber component. As a diene-based rubber, a natural rubber (NR), a diene-based synthetic rubber, or the like can be used. Examples of the diene-based synthetic rubber include an isoprene rubber (IR), a butadiene rubber (BR), a styrene-butadiene rubber (SBR), an acrylonitrile-butadiene rubber (NBR), a chloroprene rubber (CR), a butyl rubber (IIR), etc. These rubber components may be used alone or in combination of two or more thereof. Among them, the NR, BR, and SBR are preferable because they show well-balanced fuel efficiency and wet grip performance, and more preferably BR and SBR are used in combination.

(Styrene-Butadiene Rubber (SBR))

Examples of the SBR include, but not particularly limited to, an emulsion-polymerized SBR (E-SBR), a solution-polymerized SBR (S-SBR), etc. One obtained by modifying these SBRs with a modifier (modified SBR), a hydrogen additive of these SBRs (hydrogenated SBR), etc. can be also used. Among them, the S-SBR is preferable. These SBRs may be used alone or in combination of two or more thereof.

Further, the modified SBR may be one having a main chain and/or a terminal modified with a modifier, for example one modified with a polyfunctional modifier such as a tin tetrachloride and a silicon tetrachloride to partially have a branched structure. Among them, one modified with a modifier and having a functional group in which a main chain and/or a terminal in a SBR interact with silica is particularly preferable. By using a modified styrene-butadiene rubber modified with such a modifier and having a functional group interacting with silica, fuel efficiency and wet grip performance can be improved with even better balance.

When the rubber composition composing the tread contains a SBR, the content of the SBR in 100% by mass of the rubber component is preferably 40% by mass or more, more preferably 50% by mass or more, and even more preferably 60% by mass or more. When the content of the SBR is 40% by mass or more, wet grip performance required for the tread rubber tends to be secured. Further, the content of the SBR in 100% by mass of the rubber component is preferably 95% by mass or less, more preferably 90% by mass or less, and even more preferably 85% by mass or less. When the content of the BR is 95% by mass or less, abrasion resistance and rolling resistance performance tend to be improved. Besides, if more than one SBRs are used in combination, the total content of all SBRs is defined as a content of the SBRs in the rubber component.

(Butadiene Rubber (BR))

Examples of the BR include, but not particularly limited to, those commonly used in the tire industry, for example, a BR having a content of cis-1,4 bond of less than 50% (low cis BR), a BR having a content of cis-1,4 bond of 90% or more (high cis BR), a rare-earth-based butadiene rubber synthesized using a rare-earth element-based catalyst (rare-earth BR), a BR containing a syndiotactic polybutadiene crystal (SPB-containing BR), a modified BR (high cis modified BR, low cis modified BR) and the like. Among them, it is more preferable to use the high cis BR in light of abrasion resistance performance.

Examples of the high cis BR include, for example, the high cis BR manufactured and sold by JSR Corporation, ZEON CORPORATION, Ube Industries, Ltd., etc. Among the high cis BRs, a BR having a content of cis-1,4 bond of 95% or more is even preferable. These high cis BRs may be used alone or in combination of two or more thereof. When the rubber component contains a high cis BR, low temperature characteristics and abrasion resistance can be improved. A content of cis-1,4 bond in a BR is a value calculated by an infrared absorption spectrum analysis.

When the rubber composition composing the tread contains a BR, the content of the BR in 100% by mass of the rubber component is preferably 5% by mass or more, more preferably 10% by mass or more, and even more preferably 15% by mass or more. When the content of the BR is 5% by mass or more, balance between abrasion resistance and rolling resistance tends to be improved. Further, the content of the BR in 100% by mass of the rubber component is preferably 60% by mass or less, more preferably 50% by mass or less, and even more preferably 40% by mass or less. When the content of the BR is 60% by mass or less, wet grip performance tends to be improved.

A total content of the SBR and BR in 100% by mass of the rubber component is preferably 80% by mass or more, more preferably 90% by mass or more, and even more preferably 100% by mass. When the total content of the SBR and the BR is 80% by mass or more, a good balance between wet grip performance, abrasion resistance performance, and low heat generation performance can be maintained.

(Silica)

Examples of silica includes, but not limited particularly limited to, for example, silica prepared by a dry method (anhydrous silica), silica prepared by a wet method (hydrous silica) and the like. Among them, the silica prepared by a wet method is preferred for the reason that it contains many silanol groups and has many reaction points with a silane coupling agent. The present invention uses silica having a BET specific surface area ($N_2SA$) of 180 to 280 $m^2/g$. The silica may be used alone or in combination of two or more thereof.

The silica has a BET specific surface area of 180 $m^2/g$ or more, preferably 190 $m^2/g$ or more, more preferably 200 $m^2/g$ or more, and even more preferably 235 $m^2/g$. When the BET specific surface area of the silica is less than 180 $m^2/g$, reinforcing property of the rubber reinforcement required for the tire cannot be secured, and abrasion resistance cannot be secured. Further, the BET specific surface area of the silica is 280 $m^2/g$ or less, preferably 260 $m^2/g$ or less, and more preferably 250 $m^2/g$ or less. When the BET specific surface area of the silica exceeds 280 $m^2/g$, processability deteriorates and processing becomes difficult. Besides, a BET specific surface area of silica in the present specification is a value measured by a BET method according to ASTM D3037-81.

A content of the silica based on 100 parts by mass of the rubber component is 30 parts by mass or more, preferably 40 parts by mass or more, and more preferably 50 parts by mass or more. When the content of the silica is less than 30 parts by mass, reinforcing property required for the tire cannot be obtained. Further, the content of the silica based on 100 parts by mass of the rubber component is 120 parts by mass or less, preferably 100 parts by mass or less, and more preferably 90 parts by mass or less. When the content of the silica exceeds 120 parts by mass, processability deteriorates and processing becomes difficult.

(Silane Coupling Agent)

It is preferable to use a silane coupling agent in order to contain silica. Examples of the silane coupling agent include, for example, sulfide-based silane coupling agents such as bis(3-triethoxysilylpropyl)disulfide and bis(3-triethoxysilylpropyl)tetrasulfide; mercapto-based silane coupling agents such as 3-mercaptopropyltrimethoxysilane and 3-mercaptopropyltriethoxysilane; thioether-based silane coupling agents such as 3-octanoylthio-1-propyltriethoxysilane, 3-hexanoylthio-1-propyltriethoxysilane, and 3-octanoylthio-1-propyltrimethoxysilane; vinyl-based silane coupling agents such as vinyltriethoxysilane; amino-based silane coupling agents such as 3-aminopropyltriethoxysilane; glycidoxy-based silane coupling agents such as γ-glycidoxypropyltriethoxysilane; nitro-based silane coupling agents such as 3-nitropropyltrimethoxysilane; and chloro-based silane coupling agents such as 3-chloropropyltrimethoxysilane. These silane coupling agents may be used alone or in combination of two or more thereof. Among them, the sulfide-based coupling agents, especially bis(3-triethoxysilylpropyl)tetrasulfide and 3-trimethoxysilylpropylbenzothiazolyltetrasulfide, are preferable in light of easy temperature control of reaction with silica and improvement effect on reinforcing property of the rubber composition.

When the silane coupling agent is compounded, a content of the silane coupling agent is preferably 1 part by mass or more, and more preferably 2 parts by mass or more, based on 100 parts by mass of the silica. When the content of the silane coupling agent is less than 1 part by mass, viscosity of an unvulcanized rubber composition becomes high and processability tends to deteriorate. Further, the content of the silane coupling agent based on 100 parts by mass of silica is preferably 20 parts by mass or less, and more preferably 15 parts by mass or less. When the content of the silane coupling agent exceeds the content of 20 parts by mass, compounding effect of the silane coupling agent corresponding to the content cannot be obtained, and the cost tends to be high.

(Other Compounding Agents)

In addition to the above-mentioned components, the rubber composition for a tire can appropriately contain rubber components other than diene-based rubbers, and compounding agents generally used in the conventional rubber industry, for example, a reinforcing filler other than silica, various softeners, various antioxidants, wax, zinc oxide, stearic acid, a vulcanizing agent, a vulcanization accelerator and the like, as necessary.

(Reinforcing Fillers Other than Silica)

As a reinforcing filler other than silica, those which have been used in a rubber composition for a tire, such as carbon black, calcium carbonate, alumina, clay, and talc, can be blended to the rubber composition.

(Carbon Black)

The carbon black is not particularly limited, and GPF, FEF, HAF, ISAF, SAF and the like can be used alone or in combination of two or more thereof.

A nitrogen adsorption specific surface area ($N_2SA$) of the carbon black is preferably 80 $m^2/g$ or more, more preferably 100 $m^2/g$ or more, and even more preferably 110 $m^2/g$ or more. Further, the $N_2SA$ is preferably 300 $m^2/g$ or less, and more preferably 250 $m^2/g$ or less. Besides, the $N_2SA$ of the carbon black is measured in accordance with JIS K6217, Method A.

When the carbon black is compounded, a content of the carbon black based on 100 parts by mass of the rubber component is preferably 1 part by mass or more, and more preferably 5 parts by mass or more. Further, the content of the carbon black based on 100 parts by mass of the rubber component is preferably 50 parts by mass or less, and more preferably 30 parts by mass or less. When the content of the carbon black is within the above-mentioned range, good fuel efficiency and abrasion resistance can be obtained.

(Softener)

Examples of the softener include petroleum softeners such as a process oil, a lubricating oil, paraffin, a liquid paraffin, a petroleum asphalt, and petrolatum, fatty oil-based softeners such as a soybean oil, a palm oil, a castor oil, a linseed oil, a rapeseed oil, and a coconut oil, a tall oil, factice, waxes such as beeswax, a carnauba wax, and lanolin, and fatty acids such as linoleic acid, palmitic acid, stearic acid, and lauric acid, etc. A compounding amount of the softener is preferably 100 parts by mass or less based on 100 parts by mass of the rubber component. In this case, a risk of lowering wet grip performance is low.

(Oil)

Examples of the oil include process oils such as a paraffin process oil, an aromatic process oil, and a naphthenic process oil.

When the oil is compounded, a content of the oil based on 100 parts by mass of the rubber component is preferably 10 parts by mass or more, and more preferably 15 parts by mass or more. Further, the content of the oil is preferably 60 parts by mass or less, and more preferably 55 parts by mass or less based on 100 parts by mass of the rubber component. When the oil content is within the above-mentioned range, effect of containing the oil is sufficiently obtained, and good abrasion resistance can be obtained. Besides, the content of the oil herein includes an amount of oil included in an oil-extended rubber.

(Liquid Diene-Based Polymer)

Examples of the liquid diene-based polymer include a liquid styrene-butadiene copolymer (liquid SBR), a liquid butadiene polymer (liquid BR), a liquid isoprene polymer (liquid IR), a liquid styrene-isoprene copolymer (Liquid SIR), and the like. Among them, the liquid SBR is preferable since well-balanced abrasion resistance and stable steering stability during running can be obtained. Besides, the liquid diene-based polymer herein is a diene-based polymer under a liquid state at normal temperature (25° C.).

A weight average molecular weight (Mw) of the liquid diene-based polymer in terms of polystyrene measured by gel permeation chromatography (GPC) is preferably $1.0 \times 10^3$ or more, and more preferably $3.0 \times 10^3$ or more, in light of abrasion resistance, breaking resistance, and durability. Further, the Mw is preferably $2.0 \times 10^5$ or less, and more preferably $1.5 \times 10^4$ or less, in light of productivity. Besides, the Mw of the liquid diene-based polymer herein is a value in terms of polystyrene measured by gel permeation chromatography (GPC).

When the liquid diene-based polymer is compounded, a content of the liquid diene-based polymer based on 100 parts by mass of the rubber component is preferably 3 parts by mass or more, and more preferably 5 parts by mass or more. Further, the content of the liquid diene-based polymer is preferably 30 parts by mass or less, and more preferably 20 parts by mass or less. When the content of the liquid diene-based polymer is within the above-mentioned range, good wet grip performance can be obtained, and effects of the present invention tend to be easily obtained.

(Antioxidant)

The antioxidant is not particularly limited, and for example, antioxidants such as amine-, phenol-, and imidazole-based compounds and carbamic acid metal salt can be appropriately selected and blended to the rubber composition. These antioxidants may be used alone or in combination of two or more thereof. Among them, the amine-based antioxidants are preferable because of their high antioxidant effect, and more preferable are p-phenylenediamine-based antioxidants such as N-(1,3-dimethylbutyl)-N'-phenyl-p-phenylenediamine, N-isopropyl-N'-phenyl-p-phenylenediamine, N,N'-diphenyl-p-phenylenediamine, N,N'-di-2-naphthyl-p-phenylenediamine, N-cyclohexyl-N'-phenyl-p-phenylenediamine, N,N'-bis(1-methylheptyl)-p-phenylenediamine, N,N'-bis(1,4-dimethylpentyl)-p-phenylenediamine, N,N'-bis(1-ethyl-3-methylpentyl)-p-phenylenediamine, N-4-methyl-2-pentyl-N'-phenyl-p-phenylenediamine, N,N'-diaryl-p-phenylenediamine, hindered diaryl-p-phenylenediamine, phenylhexyl-p-phenylenediamine, and phenyloctyl-p-phenylenediamine, and particularly preferable is N-(1,3-dimethylbutyl)-N'-phenyl-p-phenylenediamine.

When the antioxidant is compounded, a content of the antioxidant based on 100 parts by mass of the rubber component is preferably 0.5 part by mass or more, and more preferably 1 part by mass or more. Further, the content of the antioxidant based on 100 parts by mass of the rubber component is preferably 5 parts by mass or less, and more preferably 3 parts by mass or less. When the content of the antioxidant is within the above-mentioned range, antioxidant effect can be sufficiently obtained, and there is a tendency to be able to inhibit discoloration due to precipitation of the antioxidant on a tire surface.

Besides the above-mentioned components, as stearic acid, zinc oxide, wax, etc., those which have been conventionally used in the rubber industry can be used.

(Vulcanizing Agent)

The rubber composition can contain a vulcanizing agent. As a vulcanizing agent, an organic peroxide or a sulfur-based vulcanizing agent can be used. As an organic peroxide, for example, benzoyl peroxide, dicumyl peroxide, di-t-butyl peroxide, t-butylcumyl peroxide, methyl ethyl ketone peroxide, cumene hydroperoxide, 2,5-dimethyl-2,5-di(t-butylperoxy) hexane, 2,5-dimethyl-2,5-di(benzoylperoxy) hexane, 2,5-dimethyl-2,5-di(t-butylperoxy) hexyne-3, 1,3-bis(t-butylperoxypropyl)benzene, and the like can be used. Further, as a sulfur-based vulcanizing agent, for example, sulfur, morpholine disulfide, and the like can be used. Among them, sulfur is preferable.

When the vulcanizing agent is compounded, a content of the vulcanizing agent based on 100 parts by mass of the rubber component is 0.5 part by mass or more, and preferably 1 part by mass or more. Further, the content of the vulcanizing agent based on 100 parts by mass of the rubber component is 5 parts by mass or less, and preferably 3 parts by mass or less. When the content of the vulcanizing agent is within the above-mentioned range, appropriate breaking resistance is obtained, and abrasion resistance tends to be improved.

(Vulcanization Accelerator)

Examples of the vulcanization accelerator include, but not particularly limited to, for example, sulfenamide-, thiazole-, thiuram-, thiourea-, guanidine-, dithiocarbamate-, aldehyde amine- or aldehyde ammonia-, imidazoline- and xanthate-based vulcanization accelerators. Among them, the sulfenamide- and guanidine-based vulcanization accelerators are preferable since effects of the present invention can be more appropriately obtained.

Examples of the sulfenamide-based vulcanization accelerator include CBS (N-cyclohexyl-2-benzothiazylsulfenamide), TBBS (N-t-butyl-2-benzothiazylsulfenamide), N-oxyethylene-2-benzothiazylsulfenamide, N,N'-diisopropyl-2-benzothiazylsulfenamide, N,N-dicyclohexyl-2-benzothiazylsulfenamide, and the like. Examples of the thiazole-based vulcanization accelerator include 2-mercaptobenzothiazole, dibenzothiazolyl disulfide, and the like. Examples of the thiuram-based vulcanization accelerator include tetramethylthiuram monosulfide, tetramethylthiuram disulfide, tetrabenzylthiuram disulfide (TBzTD), and the like. Examples of the guanidine-based vulcanization accelerator include diphenylguanidine (DPG), diortolyl guanidine, ortho tolyl biguanidine, and the like. These vulcanization accelerators may be used alone or in combination of two or more thereof. Among them, it is preferable to use a combination of the CBS and the DPG since effects of the present invention can be more appropriately obtained.

When the vulcanization accelerator is compounded, a content of the vulcanization accelerator based on 100 parts by mass of the rubber component is preferably 0.1 part by mass or more, more preferably 0.3 part by mass or more, even more preferably 0.5 part by mass or more. The content of the vulcanization accelerator based on 100 parts by mass of the rubber component is preferably 8 parts by mass or less, more preferably 7 parts by mass or less, and even more preferably 6 parts by mass or less. When the content of the vulcanization accelerator is within the above-mentioned range, appropriate breaking resistance is obtained, and abrasion resistance tends to be improved.

(Hardness)

A JIS A hardness of a tread obtained by using the above-mentioned rubber compositions is preferably 80 degrees or less, more preferably 77 degrees or less, even more preferably 75 degrees or less, and particularly preferably 70 degrees or less. When the tread has the JIS A hardness of 80 degrees or less, energy input to the tire is relieved, and there is a tendency to be able to prevent a decrease in abrasion resistance. Further the JIS A hardness is preferably 55 degrees or more, more preferably 56 degrees or more, even more preferably 60 degrees or more, and particularly preferably 65 degrees or more. When the tread has the JIS A hardness of 55 degrees or more, there is a tendency to be able to secure stiffness of the rubber required for the tread rubber.

(Grounding Surface Shape)

In the pneumatic tire of the present invention, under a normal state with no load where the pneumatic tire is mounted with a normal rim and filled with a normal internal pressure, a grounding surface shape in which a normal load is applied and the tread is pressed against a plane surface satisfies the equation (1). In this way, by adjusting the grounding surface shape, it becomes possible to reduce the energy input to the rubber during rolling of the tire and to more effectively bring out abrasion resistance.

FIG. 1 shows a grounding surface shape (FP: footprint) in which a tread is pressed against a plane surface as described above. The grounding surface shape preferably satisfies a relation of $0.95 \leq SL0/SL80$(grounding surface shape index) $\leq 1.6$, wherein $SL0$ is a ground contact length in a circumferential direction of the tire (a rotating direction of the tire) on a tire equator in the grounding surface shape, FP described in FIG. 1, and $SL80$ is a ground contact length in a circumferential direction of the tire on a position away from the tire equator by a distance in a tire axial direction of 80% of a tread grounding half width (a) (0.8a).

The "tread grounding half width" means half the distance of the tire axial direction between the outermost grounding ends in the tire axial direction on the grounding surface.

The "normal rim" is a rim defined, in a standard system including a standard on which the tire is based, for each tire by the standard, for example, herein referred to as a standard rim for JATMA, a "Design Rim" for TRA, or a "Measuring Rim" for ETRTO.

The "normal internal pressure" is an air pressure defined for each tire by the standard, i.e., herein referred to as a maximum air pressure for JATMA, a maximum value described in the table "TIRE LOAD LIMITS AT VARIOUS COLD INFLATION PRESSURES" for TRA, or "INFLATION PRESSURE" for ETRTO.

The "normal load" is a load defined for each tire by the standard, i.e., herein referred to as a maximum load capacity for JATMA, a maximum value described in "TIRE LOAD LIMITS AT VARIOUS COLD INFLATION PRESSURES" for TRA, or "LOAD CAPACITY" for ETRTO.

The grounding surface shape herein is specified excluding grooves of the tread. When SL0/SL80 is less than 0.95, a grounding pressure of a shoulder part increases and the energy input to the rubber increases, and consequently effects of enhancing reinforcing property by increasing a specific surface area of silica cannot be produced. When SL0/SL80 exceeds 1.6, a grounding pressure of a central part increases, and effects of enhancing reinforcing property by increasing a specific surface area of silica cannot be produced. A lower limit of SL0/SL80 is more preferably 1.00, and even more preferably 1.05. On the other hand, an upper limit of SL0/SL80 is preferably 1.55 or less, more preferably 1.50 or less, and even more preferably 1.45 or less.

The above-mentioned grounding surface shape can be obtained by appropriately adjusting methods such as a mold profile, a gauge distribution, and a structure. However, the method is not particularly limited as long as the above-mentioned grounding surface shape is achieved. For example, by adjusting a tread gauge distribution, for example adjusting thickness of a tread central part or a tread shoulder part, the grounding surface shape index (SL0/SL80) can be adjusted. Specifically, by reducing the thickness of the tread central part, the grounding surface shape index can be adjusted to a small value. However, the method of adjusting the grounding surface shape index is not particularly limited.

Method of Manufacturing a Rubber Composition for a Tread

A rubber composition for a tread can be manufactured by a general method. It can be manufactured, for example, by a method of kneading the above-mentioned components other than the crosslinking agent and the vulcanization accelerators with a general publicly-known kneading machine used in the rubber industry such as a Banbury mixer, a kneader, and an open roll (a base kneading step), then adding the crosslinking agent and the vulcanization accelerators followed by further kneading them (a finish kneading step), and then vulcanizing them, or by other methods.

Method of Manufacturing a Pneumatic Tire

A pneumatic tire can be manufactured by a usual method using the above-mentioned rubber composition for the tread. That is, it can be manufactured by extruding the above-mentioned rubber composition, which is prepared by compounding the above-mentioned compounding agents with rubber components including a diene-based rubber component as necessary, into a shape of a tread, etc., laminating the obtained extruded product with other tire members and molding it on a tire molding machine by a usual method to form an unvulcanized tire, and heating and pressurizing this unvulcanized tire in a vulcanizer. A tread can be produced by a method of laminating sheets of an unvulcanized rubber composition into a predetermined shape or also a method of inserting an unvulcanized rubber composition in two or more extruders to form two phases at outlets of heads of the extruders.

The pneumatic tire can be used for a general tire such as a tire for a passenger car, a high-performance tire for a passenger car, a heavy load tire for a truck, buses, etc., and a racing tire. Among them, the high-performance tire is preferable since silica is compounded.

Example

Hereinafter, the present invention is explained by means of Examples, but is not limited to the Examples.

Hereinafter, various chemicals used in Examples and Comparative Examples are collectively shown below.

SBR: Nipol NS616 manufactured by ZEON CORPORATION (styrene content: 21% by mass)

BR: Nipol BR1220 manufactured by ZEON CORPORATION (cis 1,4 content: 97%)

Carbon black: DIABLACK (registered trademark) N220 manufactured by Mitsubishi Chemical Corporation (nitrogen adsorption specific surface area ($N_2SA$): 115 $m^2/g$)

Silica 1: ULTRASIL (registered trademark) VN3 manufactured by Evonik Degussa GmbH (BET specific surface area: 175 $m^2/g$, average primary particle size: 18 nm)

Silica 2: ULTRASIL (registered trademark) 9100GR manufactured by Evonik Degussa GmbH (BET specific surface area: 235 $m^2/g$, average primary particle size: 15 nm)

Silane coupling agent: Si69 (bis(3-triethoxysilylpropyl) tetrasulfide) manufactured by Evonik Degussa GmbH Zinc oxide: Zinc flower No. 1 manufactured by Mitsui Mining & Smelting Co., Ltd.

Stearic acid: Bead Stearic acid "Tsubaki" manufactured by NOF CORPORATION

Oil: Mineral oil PW-380 manufactured by Idemitsu Kosan Co., Ltd.

Antioxidant: Antigen 6C (N-phenyl-N'-(1,3-dimethylbutyl)-p-phenylenediamine) manufactured by Sumitomo Chemical Co., Ltd.

Wax: SUNNOC N manufactured by OUCHI SHINKO CHEMICAL INDUSTRIAL CO., LTD.

Sulfur: Powdered sulfur manufactured by Karuizawa Iou Kabushiki Kaisha

Vulcanization accelerator 1: Nocceler CZ (N-cyclohexyl-2-benzothiazolylsulfenamide) manufactured by OUCHI SHINKO CHEMICAL INDUSTRIAL CO., LTD.

Vulcanization accelerator 2: Nocceler D (1,3-diphenylguanidine) manufactured by OUCHI SHINKO CHEMICAL INDUSTRIAL CO., LTD.

Examples 1 to 5 and Comparative Examples 1 to 5

According to the compounding formulations shown in Table 1, using a 1.7 L Banbury mixer manufactured by Kobe Steel, Ltd., all chemicals other than sulfur and vulcanization accelerators were fed and kneaded for five minutes up to a discharge temperature of 155° C. to obtain a kneaded product. Next, the compounding amounts of sulfur and vulcanization accelerators as shown in Table 1 were added to the obtained kneaded product, and then kneaded for three minutes under a condition of about 80° C. using an open roll to obtain an unvulcanized rubber composition. The obtained unvulcanized rubber composition was molded into a shape of a tread, laminated with other members, and vulcanized at 170° C. for 15 minutes to obtain pneumatic tires of Examples 1 to 5 and Comparative Examples 1 to 5 (size 195/65R15). Besides, each grounding surface shape index (SL0/SL80) was adjusted to each value shown in Table 1 by adjusting the tread gauge distribution, i.e., adjusting the thickness of the tread central part and/or the tread shoulder part.

Each grounding surface shape index (SL0/SL80), hardness, Mooney viscosity, and abrasion resistance of the pneumatic tire obtained by each example and comparative example was evaluated by the following methods. Table 1 shows the results. Further, each average of each Mooney viscosity index and abrasion resistance index is shown in Table 1 as "Average".

<Hardness>

Each hardness was measured at 25° C. with a Type A Hardness Tester in accordance with JIS K 6253.

<Mooney Viscosity Index>

Each Mooney viscosity of each unvulcanized rubber composition was measured at 130° C. in accordance with JIS K 6300, and based on Mooney viscosity of 100 in Comparative Example 1, each index was expressed by the following formula. The larger the index is, the lower the viscosity is and the easier the processing is.

(Mooney viscosity index)=(Mooney viscosity in Comparative Example 1)/(Mooney viscosity in each compounding)×100

<Abrasion Resistance>

Each tire (size 195/65R15) was mounted on a domestic FF vehicle, followed by measuring a groove depth of a tread part of the tire after a running distance of 8000 km and calculating a running distance when the groove depth decreased by 1 mm to index the calculated running distance by the following equation.

(running distance when groove depth decreases by 1 mm)/(running distance when groove depth in Comparative Example 1 decreases by 1 mm)×100

The larger the index is, the better the abrasion resistance is. A target value for the index is 105 or more.

<Grounding Surface Shape Index (SL0/SL80)>

The index was calculated by the method described above. The larger the value is, the longer (rounder) the ground contact length of a crown part is.

using silica and control the energy input to the rubber, i.e., it becomes possible to establish both processability and abrasion resistance performance of the rubber.

The invention claimed is:

1. A pneumatic tire comprising a tread composed of a rubber composition, the rubber composition containing 30 to 120 parts by mass of silica having a BET specific surface area of 180 to 280 m$^2$/g based on 100 parts by mass of a rubber component,
    wherein, under a state where the pneumatic tire is mounted on a rim adapted to receive the tire and the tire filled with air at an internal pressure, a grounding surface shape in which a load is applied to the tire and the tread is pressed against a plane surface satisfies the following equation (1): $0.95 \leq SL0/SL80 \leq 1.6$ (1) (wherein SL0 is a ground contact length in a circumferential direction of the tire on a tire equator, and SL80 is a ground contact length in a circumferential direction of the tire on a position away from the tire equator by a distance in a tire axial direction of 80% of a tread grounding) half width, wherein
    the rim is a rim defined for the tire by a standard on which the tire is based,
    the standard including JATMA, TRA, and ETRTO,
    the internal pressure is an air pressure defined for the tire by the standard, and
    the load is a load defined for the tire by the standard.

2. The pneumatic tire of claim 1, wherein the rubber composition further contains carbon black.

TABLE 1

|  | Example | | | | | Comparative Example | | | | |
| --- | --- | --- | --- | --- | --- | --- | --- | --- | --- | --- |
|  | 1 | 2 | 3 | 4 | 5 | 1 | 2 | 3 | 4 | 5 |
| Compounding Amount (Part by mass) | | | | | | | | | | |
| SBR | 70 | 70 | 70 | 70 | 70 | 70 | 70 | 70 | 70 | 70 |
| BR | 30 | 30 | 30 | 30 | 30 | 30 | 30 | 30 | 30 | 30 |
| Carbon black | 10 | 10 | 10 | 10 | 10 | 10 | 10 | 10 | 10 | 10 |
| Silica 1 | — | — | — | — | — | 70 | — | — | — | — |
| Silica 2 | 70 | 70 | 70 | 50 | 90 | — | 70 | 70 | 20 | 140 |
| Silane coupling agent | 5.6 | 5.6 | 5.6 | 4.0 | 7.2 | 5.6 | 5.6 | 5.6 | 1.6 | 11.2 |
| Oil | 25 | 25 | 25 | 25 | 25 | 25 | 25 | 25 | 25 | 25 |
| Wax | 2 | 2 | 2 | 2 | 2 | 2 | 2 | 2 | 2 | 2 |
| Antioxidant | 2 | 2 | 2 | 2 | 2 | 2 | 2 | 2 | 2 | 2 |
| Stearyl acid | 2.5 | 2.5 | 2.5 | 2.5 | 2.5 | 2.5 | 2.5 | 2.5 | 2.5 | 2.5 |
| Zinc oxide | 2 | 2 | 2 | 2 | 2 | 2 | 2 | 2 | 2 | 2 |
| Sulfur | 1.5 | 1.5 | 1.5 | 1.5 | 1.5 | 1.5 | 1.5 | 1.5 | 1.5 | 1.5 |
| Vulcanization accelerator 1 | 2 | 2 | 2 | 2 | 2 | 2 | 2 | 2 | 2 | 2 |
| Vulcanization accelerator 2 | 1.5 | 1.5 | 1.5 | 1.5 | 1.5 | 1.5 | 1.5 | 1.5 | 1.5 | 1.5 |
| Grounding surface shape index (SL0/SL80) | 1.20 | 1.05 | 1.45 | 1.20 | 1.20 | 1.20 | 0.85 | 1.70 | 1.20 | 1.20 |
| Evaluation | | | | | | | | | | |
| Hardness | 66 | 66 | 66 | 56 | 77 | 63 | 66 | 66 | 45 | 63 |
| Mooney viscosity | 90 | 90 | 90 | 120 | 85 | 100 | 90 | 90 | 135 | 65 |
| Abrasion resistance | 120 | 125 | 115 | 115 | 135 | 100 | 103 | 99 | 45 | 75 |
| Average | 105 | 108 | 103 | 118 | 110 | 100 | 97 | 95 | 90 | 70 |

From the results shown in Table 1, it can be found out that, by defining a BET specific surface area and content of silica, and a grounding surface shape index (SL0/SL80) of the tire, it becomes possible to increase the rubber reinforcement by 3. The pneumatic tire of claim 1, wherein the rubber composition further contains a silane coupling agent.

4. The pneumatic tire of claim 1, wherein the tread has a JIS K6253 Type A hardness of 55 to 80.

5. The pneumatic tire of claim 2, wherein a content of the carbon black based on 100 parts by mass of the rubber composition is 10 to 50 parts by mass.

6. The pneumatic tire of claim 1, wherein a content of the silica and carbon black based on 100 parts by mass of the rubber composition is 80 parts by mass or more.

7. The pneumatic tire of claim 4, wherein the tread has a JIS K6253 Type A Hardness of 65 to 80.

* * * * *